United States Patent [19]
Shiraiwa et al.

[15] 3,662,590
[45] May 16, 1972

[54] PRECOOLING APPARATUS FOR CONTINUOUS AUTOMATIC ULTRASONIC INSPECTION

[72] Inventors: Toshio Shiraiwa, Ikoma-gun; Hisao Yamaguchi, Akashi; Yasunori Kido, Nishinomiha, all of Japan

[73] Assignee: Sumitomo Metal Industries, Ltd., Higashi-ku, Osaka, Japan

[22] Filed: July 29, 1970

[21] Appl. No.: 59,111

[30] Foreign Application Priority Data

Aug. 9, 1969 Japan....................................44/75367

[52] U.S. Cl. ............................................73/71.5, 73/67.85
[51] Int. Cl. ......................................................G01n 29/00
[58] Field of Search ..............................73/67.5, 67.8 S, 71.5

[56] References Cited

UNITED STATES PATENTS 3,303,691  2/1967  Beaujard et al..........................73/71.5

FOREIGN PATENTS OR APPLICATIONS 1,275,693  6/1960  France..................................73 71.5/

Primary Examiner—Richard C. Queisser
Assistant Examiner—Arthur E. Korkosz
Attorney—Kurt Kelman

[57] ABSTRACT

A continuous automatic ultrasonic inspection apparatus detects flaws in a material by transmitting pulses or continuous waves into the material to be inspected through the medium of a laminar flow water jet column. The precooling apparatus is provided near the laminar flow water jet column and improves the accuracy of flaw detection of the material at high temperature moving at high speed and also increases the maximum inspection temperature.

3 Claims, 6 Drawing Figures

PRECOOLING APPARATUS FOR CONTINUOUS AUTOMATIC ULTRASONIC INSPECTION

BACKGROUND OF THE INVENTION

The present invention relates to a precooling apparatus for the continuous and automatic ultrasonic inspection of a material of comparatively high temperature, and more particularly, to a precooling apparatus with a construction completely preventing cooling water of the precooling apparatus from mixing with the laminar flow water jet column which is the medium for transmitting ultrasonic waves to the material to be inspected so that the flaw detecting process is not disturbed.

In the conventional ultrasonic inspection method, the flaw in the material is detected by the reflected waves or penetrated waves of the supersonic pulses or continuous waves transmitted into the material to be inspected through the medium of the laminar flow water jet column. When the material to be inspected is at high temperature and moving at high speed, with the cooling effect of the laminar flow jet of only the inspection apparatus itself, it is possible to successfully inspect the object at a temperature up to 200°C at best. With material of higher temperature than 200°C, a thin film of vapor is formed between the surface of the material and the tip of the laminar flow water jet column to disturb the penetration of the ultrasonic waves and to increase the SN ratio (signal noise ratio) thereby to reduce the accuracy of flaw detection. Consequently, it has been accepted that the maximum inspection temperature by this method is 200°C, or preferably 150°C.

For this reason, in the conventional inspection apparatus, so-called precooling is generally practised, namely spraying a large quantity of water to cool the hot material before the laminar flow water jet column through which the ultrasonic waves are sent. In this case, however, the precooling water may flow into the main laminar flow water jet column transmitting the ultrasonic waves and an erroneous signals may be generated. Especially, when the object material at high temperature is moving at high speed like when the apparatus is installed within the outlet conveyor of a continuous rolling mill, the precooling water would flow into the main laminar flow water jet column in large quantities and at high speed to make the inspection impossible.

SUMMARY OF THE INVENTION

Objects of the present invention are to provide an improved precooling apparatus adapted to effectively precool a material to be inspected which is of high temperature and moving at comparatively high speed and not to adversely affect the laminar flow water jet column for transmitting ultrasonic waves, thereby to improve the accuracy of flaw detection, to increase the maximum inspection temperature and to improve the productivity of the mill.

In order to attain the objects of the present invention two cooling methods are regarded as possible, namely cooling by laminar flow and cooling by spray. However, we have found that the cooling by laminar flow is superior to the other in the absolute quantity of cooling intensity but the cooling by spray is superior in the cooling intensity per unit flow quantity. In cooling by laminar flow, for example, if the nozzle diameter is 1 mm and the flow quantity is 1 lit/min, Heat Quantity Q/Flow Quantity $W = 1.67 \times 10^4$ KCal/m²·lit But, in cooling by spray, if the nozzle diameter is 1 mm, spray air pressure 1 Kg/cm², and flow quantity 1 lit/min $$Q/W = 8 \times 10^4 \text{ KCal/m}^2\text{·lit}$$

Accordingly, in the precooling apparatus according to the present invention the spray cooling method, which is superior in the cooling intensity per unit flow quantity, is adopted, namely, a plurality of spray nozzles are disposed at a prescribed space from the upper and lower surfaces of the object material at high temperature for sufficient precooling and at least one spray nozzle is disposed immediately before the main laminar flow jet column with the nozzle tip to the incoming direction of the object material so as to prevent the cooling water of the other spray nozzles from mixing into the main laminar flow water jet column. Thus the maximum inspection temperature may be increased and the inspection accuracy may be improved. According to experimental results, the maximum inspection temperature in spray precooling is about 400°C.

By combining the laminar flow precooling and the spray precooling, a good cooling effect may be obtained though in this case the cooling intensity is slightly inferior to that of the spray precooling alone. Thus, a plurality of auxiliary laminar flow nozzles may be disposed before the main laminar flow water jet column at a prescribed space from the upper and lower surfaces of the object material at high temperature and at least one spray nozzle is disposed immediately before the main laminar flow water jet column with the nozzle tip to the object material incoming direction so as to prevent the cooling water of the laminar flow nozzles from mixing into the main laminar flow water jet column. The development tests revealed that the material at a temperature up to 330°C can be inspected in this laminar flow and spray combined precooling structure.

BRIEF DESCRIPTION OF THE DRAWINGS

FIG. 3b is a partial top view of the apparatus of FIG. 3a;

DETAILED DESCRIPTION OF THE PREFERRED EMBODIMENTS

Figure 1:
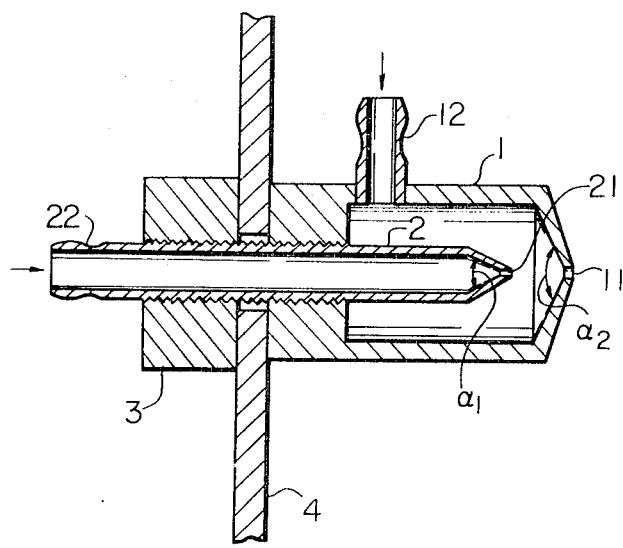
FIG. 1 is a sectional view of a spray nozzle for use with the apparatus according to the present invention.

The spray nozzle for use with the precooling apparatus according to the present invention shown in FIG. 1 comprises an outer nozzle body 1 into which is screwed an inner nozzle body 2, the assembly being fixed to a panel 4 by a nut 3. The axial distance between the inner nozzle 21 and the outer nozzle 11 may be controlled by rotating the inner nozzle body 2. Water under a pressure of 2 – 10 Kg/cm² is conducted through the passage 22 to be ejected from the inner nozzle 21 having a conical tip enclosing an angle $\alpha_1$ of 45° – 180°, and compressed air of 1 – 2 Kg/cm² pressure is conducted through the connecting passage 12 to the space within the outer nozzle body 1 and is ejected from a conical outer nozzle 11 having the tip enclosing an angle $\alpha_2$ of 60° – 180° to obtain an cooling water spray of adequate angle. The shape of the spray and the droplet size of the sprayed water may be adjusted by controlling the conus angles of the tips of the inner and outer nozzles, the axial distance between the nozzles and the pressure of the compressed air, and the quantity of the sprayed water may be regulated by controlling the nozzle diameters and the pressure of the cooling water.

Figure 2:
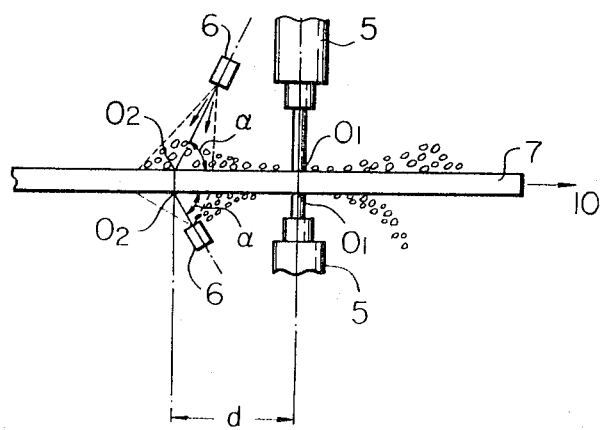
FIG. 2 is a schematic sectional view showing a structure for preventing the cooling water from flowing into the laminar flow water jet column of the main nozzle for transmission of ultrasonic waves.

FIG. 2 shows the flow of water adjacent to the detecting point while a material 7 at high temperatures is moving in the direction shown by an arrow 10 for ultrasonic inspection by the main laminar flow water jet columns 5, 5. On the upper surface of the material 7, splashes of the main laminar flow water jet column and the cooling water flowing in from the precooling apparatus present turbulences which cause the inspection accuracy to decrease. On the lower surface of the material 7, both of the water of the main laminar flow water jet column and that of the precooling apparatus immediately falls down without causing an adverse influence on the inspection accuracy as on the upper surface, but on the other hand the cooling intensity is much lower than that on the upper surface. Accordingly, as shown in the figure, a spray nozzle 6 is disposed adjacent each surface of the material 7 immediately before the main laminar flow water jet column and the angle of the spray nozzles and the moving direction of the material 7 is adjusted so that the distance d between the center $O_2$ of the striking point of the spray and the center $O_1$ of the main laminar flow water jet column is 30 – 300 mm. The minimum distance is fixed at 30 mm to give a cooling effect up to immediately before the detecting point and the maximum distance is fixed at 300 mm because if water is sprayed farther than that distance it will be unable to prevent the precooling water from rushing into the main laminar flow water jet column and because there are other precooling means before the spray nozzle. The spray direction of the spray nozzle is directed opposite the direction of movement of the material in order to prevent the water of the precooling spray or laminar flow disposed before that spray nozzle from flowing into the main laminar flow water jet column 5 and to make the precooling effect sufficient.

Figure 3A:
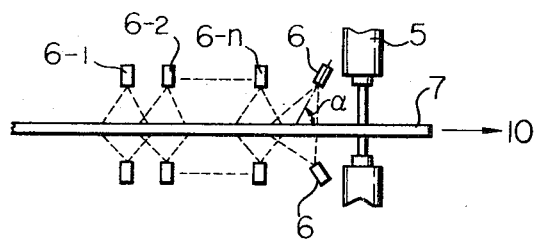
FIG. 3a is a front view of a precooling apparatus according to the present invention.
Figure 3B:
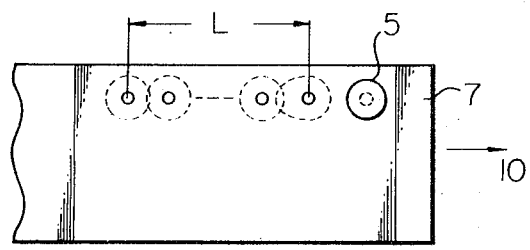

Another embodiment wherein a plurality of spray nozzles 6 are disposed before the laminar flow nozzle 5 is shown in FIG. 3. Precooling spray nozzles 6–1, 6–2, . . . 6–n disposed in parallel in pairs adjacent the upper and lower sides of the material are arranged vertically or at an acute angle in the direction from which the material is fed and the placement and the sprays of each nozzle are adjusted so that the spraying spreads will partially overlap each other on the surfaces of the material as shown in FIG. 3b. The spray nozzle 6 disposed immediately before the main laminar flow water jet column nozzle 5 for transmitting ultrasonic waves, as described in association with FIG. 2, spray water with an angle α against the moving direction 10 of the material 7 so as to strengthen the cooling effect and prevent the spray cooling water from flowing into the main laminar flow water jet column.

Table 1 shows the experimental results on the cooling intensity in the embodiment shown in FIG. 3 wherein the angle α between the spray nozzle and the material is 50° both at the upper and lower surfaces, the precooling length is 220 – 380 mm between which four to five spray nozzles are disposed in series adjacent both surfaces. The water quantity of both main laminar flow nozzles 5 is 8 lit/min, water pressure of the spray nozzle is 3 Kg/cm², air pressure of the same nozzle is 2 Kg/cm², moving rate namely inspection (flaw detection) rate of the material is 1 m/sec. Thickness of the material is kept at 220 mm throughout the tests.

Figure 5:
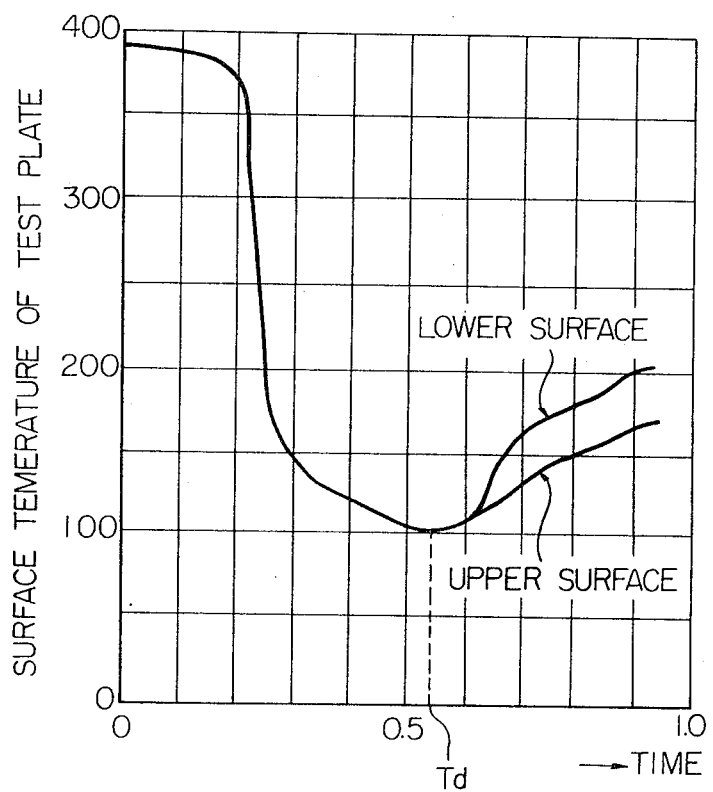
FIG. 5 is a temperature curve of a high temperature material cooled by the precooling apparatus according to the present invention.

As is evident from the results shown in Table 1 and the cooling temperature chart in FIG. 5 (corresponds to the Test 4), simply by disposing four to five nozzles before the main laminar flow water jet column nozzle 5 with the pitch of 50 – 70 mm, the surface temperature of the object material which is nearly 400°C initially, is cooled down close to 100°C within 0.4 second at the detection point. After the detection, the initial surface temperature is gradually restored by the heat capacity of the material.

As described above, if the maximum surface temperature of the material for flaw detection is generally 200°C, the spray nozzle precooling method according to the present invention increases the maximum temperature to almost twice as high as that up to 400°C. Moreover, this method requires no large scale cooling apparatus except a small space no longer than 250 – 400 mm in front of the main laminar flow nozzle, and yet it produces a great effect.

Figure 4:
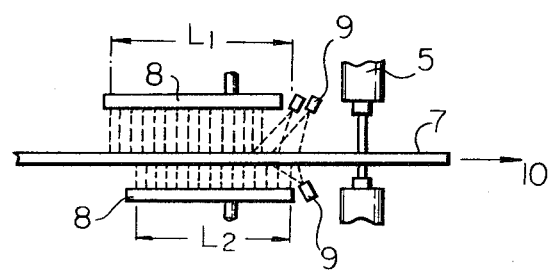
FIG. 4 is a front view of another embodiment of the precooling apparatus according to the present invention.

In the embodiment shown in FIG. 4, tens or hundreds of laminar flow nozzles 8 of a nozzle diameter of 3 mm are disposed adjacent the upper and the lower surfaces of the material 7 instead of a plurality of spray nozzles 6–1, 6–2, . . . 6–n used in the embodiment shown in FIG. 3. Immediately before the main laminar flow nozzle 5 for transmitting ultrasonic waves, as shown in the embodiment of FIG. 3, one or two spray nozzles 9 are disposed adjacent both surfaces with an angle of 50° to the moving direction 10 of the material 7 in order to increase the cooling effect and to completely prevent the cooling water of the laminar flow nozzles 8 from flowing into the main laminar flow water jet 5. The test results of this second embodiment are shown in Table 2.

TABLE 2

| | Inspecting temperature | | Flow quantity of precooling water (lit/min) | | | | Precooling length (mm) | | |
| --- | --- | --- | --- | --- | --- | --- | --- | --- | --- |
| Test No. | Material temp. before precooling | Material temp. after precooling (at detection point) | Upper laminar nozzle | Upper spray nozzle | Lower laminar nozzle | Lower spray nozzle | $L_1$ (upper) | $L_2$ (lower) | Water temp. (°C) |
| 11 | 290 | 105 | 10 | 1 | 13 | 1 | 260 | 260 | 22 |
| 12 | 330 | 120 | 8 | 1 | 12 | 1 | 280 | 220 | 22 |
| 13 | 335 | 135 | 10 | 2 | 12 | 1 | 280 | 220 | 25 |
| 14 | 345 | 130 | 8 | 2 | 12 | 1 | 280 | 220 | 25 |

TABLE 1

| | Inspecting temperature (° C.) | | | | |
| --- | --- | --- | --- | --- | --- |
| Test No. | Material temp. before precooling | Material temp. after precooling¹ | Water quantity (lit./min.) from spray nozzle × number of nozzle² | Precooling length L (mm.) | Water temperature (° C.) |
| 1 | 365 | 130 | 1.8 lit./min×5p | 340 | 12 |
| 2 | 355 | 135 | 1.8 lit./min.×5p | 380 | 12 |
| 3 | 400 | 130 | 1.8 lit./min.×5p | 330 | 13 |
| 4 | 385 | 110 | 1.8 lit./min.×5p | 270 | 13 |
| 5 | 350 | 130 | 1.8 lit./min.×4p | 220 | 13 |
| 6 | 380 | 130 | 1.8 lit./min.×4p | 270 | 15 |

¹ At detection point.  ² Common with upper and lower surfaces.

The disposing principle of the spray nozzles 9 and the test dimensions are the same as those in the first embodiment. As is evident from Table 2, the cooling method by combination of laminar flow nozzles and spray nozzles can practically precool the material at high temperature up to 330°C though it needs more cooling water than the cooling by spray nozzles only as used in the first embodiment.

As is evident from the foregoing descriptions, the precooling apparatus according to the present invention notably increases the maximum inspection temperature and improves the accuracy of flaw detection.

We claim:

1. In combination with an ultrasonic flaw detector comprising a main nozzle arranged to emit a laminar flow water jet column against a material moving past the main nozzle, ultrasonic energy being transmitted to the material through the laminar flow water jet column and being reflected therefrom through the column: a precooling apparatus comprising
   1. a group of nozzles disposed upstream from the main nozzle in the moving direction of the material for emitting cooling water sprays on the moving material, and
   2. at least one additional water spray nozzle disposed between the main nozzle and said group of nozzles for emitting a cooling water spray on the material, each additional water spray nozzle being arranged to emit the water spray in a direction opposite the moving direction of the material and to strike the material at a point between 30 mm and 300 mm upstream of the point at which the laminar flow water jet column strikes the material whereby the cooling water from the group of nozzles is prevented from mixing with the water from said column.

2. In the combination of claim 2, wherein the nozzles of the group are each adapted to emit a laminar flow water jet.

3. In the combination of claim 2, wherein each additional water spray nozzle is directed against the material at an acute angle.

* * * * *